United States Patent
Laderman (10) Patent No.: US 6,920,340 B2
(45) Date of Patent: Jul. 19, 2005

(54) SYSTEM AND METHOD FOR REDUCING EXPOSURE TO ELECTROMAGNETIC RADIATION

(76) Inventor: Raphael Laderman, 3530 18th St., San Francisco, CA (US) 94110

( * ) Notice: Subject to any disclaimer, the term of this patent is extended or adjusted under 35 U.S.C. 154(b) by 70 days.

(21) Appl. No.: 10/695,977

(22) Filed: Oct. 28, 2003

(65) Prior Publication Data

US 2004/0087352 A1 May 6, 2004

Related U.S. Application Data

(60) Provisional application No. 60/422,019, filed on Oct. 29, 2002.

(51) Int. Cl.[7] .................................................. H04M 1/05
(52) U.S. Cl. .............................. 455/569.1; 455/556.1; 455/41.2; 455/575.2; 381/74; 359/244
(58) Field of Search ........................... 455/550.1–553.1, 455/425, 41.2, 556.1, 557, 569.1, 575.2; 359/244–245, 305; 381/74, 79, 307

(56) References Cited

U.S. PATENT DOCUMENTS

| | | | | |
|---|---|---|---|---|
| 5,375,174 A | * | 12/1994 | Denenberg | 381/74 |
| 6,223,029 B1 | * | 4/2001 | Stenman et al. | 455/557 |
| 6,636,749 B2 | * | 10/2003 | Holmes et al. | 455/569.2 |
| 2001/0034253 A1 | * | 10/2001 | Ruschin | 455/569 |
| 2002/0086715 A1 | * | 7/2002 | Sahagen | 455/569 |

FOREIGN PATENT DOCUMENTS

| | | | | |
|---|---|---|---|---|
| GB | 2 366 931 A | * | 4/2002 | H04M/1/02 |
| GB | WO 02/49324 A1 | * | 6/2002 | H04M/1/05 |
| GB | 2 376 593 A | * | 12/2002 | H04M/1/05 |
| HU | WO 99/34576 | * | 7/1999 | H04M/1/05 |

* cited by examiner

*Primary Examiner*—Emmanuel L. Moise
*Assistant Examiner*—Kamran Afshar
(74) *Attorney, Agent, or Firm*—Dorsey & Whitney LLP (57) ABSTRACT

A system, apparatus, and method for reducing exposure to electromagnetic radiation by transferring at least one communication between a first interface, proximate a wireless device capable of emitting radio frequency electromagnetic radiation, and a second interface. A first converter to receive the communication and in response to generate an optical communication, the first converter coupled with one of the first interface and second interface. A second converter to receive the optical communication and in response to generate a second communication, the second converter coupled with one of the first interface and the second interface, wherein the first and second converters are coupled with different interfaces. An optical coupling between the first and second converters to communicate the optical communication and to reduce transferred radiation therebetween. A method of using the system for reducing exposure to electromagnetic radiation.

26 Claims, 7 Drawing Sheets

SYSTEM AND METHOD FOR REDUCING EXPOSURE TO ELECTROMAGNETIC RADIATION

RELATED APPLICATIONS

This patent application is related to and claims the benefit of priority under 35 U.S.C. 119(e) to U.S. Provisional Patent Application No. 60/422,019 filed 29 Oct. 2002 and entitled SYSTEM AND METHOD FOR REDUCING EXPOSURE TO ELECTROMAGNETIC RADIATION by inventor Raphael Laderman, which application is incorporated by reference herein.

FIELD OF THE INVENTION

The present invention relates, in general, to systems, devices and methods capable of emitting radio frequency electromagnetic radiation (RF radiation) and more particularly to a system and method for reducing human exposure to electromagnetic radiation.

BACKGROUND OF THE INVENTION

A variety of common electrical devices emit and capture radiation. A cellular telephone, for example, emits and/or captures RF radiation with the transmission and reception of communications. Similarly, portable radio transmitter-receivers, such as walkie-talkies, also emit and capture RF radiation as a part of their transmission and reception of data, voice, or other communications.

Although the scientific community is not unified in an agreement that exposure to the radio frequency electromagnetic emissions produced by wireless communicators is harmful to human health, some studies have produced results indicating this may be the case. Most of these studies have focused on possible brain damage, brain cancer, or other neurological effects that may result from such emissions, especially emissions that originate adjacent the human head and brain.

The level of radiation emitted by a portable wireless device and absorbed by a human operator is regulated in the United States by the United States Federal Communications Commission (FCC) and in other countries by similar agencies. The FCC, for example, requires manufacturers of wireless devices measure RF emissions using equipment that is designed to determine the amount of radiation that may be absorbed by a human user. A device which causes a human body to absorb more RF radiation than is allowed by FCC regulations pertaining to that class of device cannot be sold in the USA until it is modified such that it causes an absorption of no more than the maximum regulated amount.

As a result of the equivocal studies regarding the health risk of cellular and other wireless devices, and the knowledge that government regulatory agencies recognize some levels of emissions or absorptions to be disallowed because of safety concerns, some users of wireless communication devices have become concerned that there could be a health risk associated with their long-term use of these devices which emit RF radiation. Any technology that could reduce absorption of RF radiation by a user would be a welcome technological advance to help minimize the potential variety of potential health concerns.

In the prior art, various headsets have been utilized with wireless devices. Headsets typically include a microphone and an earphone and are usually held in place either by means of a flexible band over the head, by using a clip which attaches over the ear, or are placed inside the opening of the ear and held in place with friction or by means of their shape. Headsets typically connect to the wireless device by means of a cable containing two or more conductive wires.

Headsets have been utilized by wireless users who wish to reduce their cranial exposure to RF radiation. Since use of a headset allows the wireless device and its antenna to be placed at a distance from the user's head, it would seem likely that its use would reduce the amount of RF radiation transmitted to the head. Unfortunately, some recent studies have found that headsets may not always reduce cranial RF radiation exposure, but may either have little effect or, in some cases, increase it.

According to one theory, the level of exposure is maintained or increased due in part to the conductive wires, which connect the headset and the wireless device. These wires can unintentionally function as an antenna, which absorbs some of the radiation emitted by the wireless device and transfers radiation through the headset and adjacent the human head and brain. Additionally, the wireless device may also incorporate a defect that inadvertently transfers radiation from the wireless device and/or antenna through the conductive wires of a headset and thereby inadvertently increase the potential level of exposure to the users head.

Therefore a conventional headset is not entirely effective at reducing the potential level of radiation exposure and there remains a need for a system, apparatus, and method for reducing radiation exposure that may be transferred by the conductive wires. What is needed is an ability to reduce the potential level of exposure to the users that overcomes the above and other disadvantages of known headsets and wireless devices.

SUMMARY OF THE INVENTION

In summary, one aspect of the present invention is directed to a system for reducing exposure to electromagnetic radiation by transferring at least one communication between a first interface, proximate a wireless device capable of emitting radio frequency electromagnetic radiation, and a second interface. A first converter to receive the communication and in response to generate an optical communication, the first converter coupled with one of the first interface and second interface. A second converter to receive the optical communication and in response to generate a second communication, the second converter coupled with one of the first interface and the second interface, wherein the first and second converters are coupled with different interfaces. An optical coupling between the first and second converters to communicate the optical communication and to reduce transferred radiation there between. A method of using the system for reducing exposure to electromagnetic radiation is also disclosed.

The system and method for reducing exposure to electromagnetic radiation of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF EMBODIMENTS OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
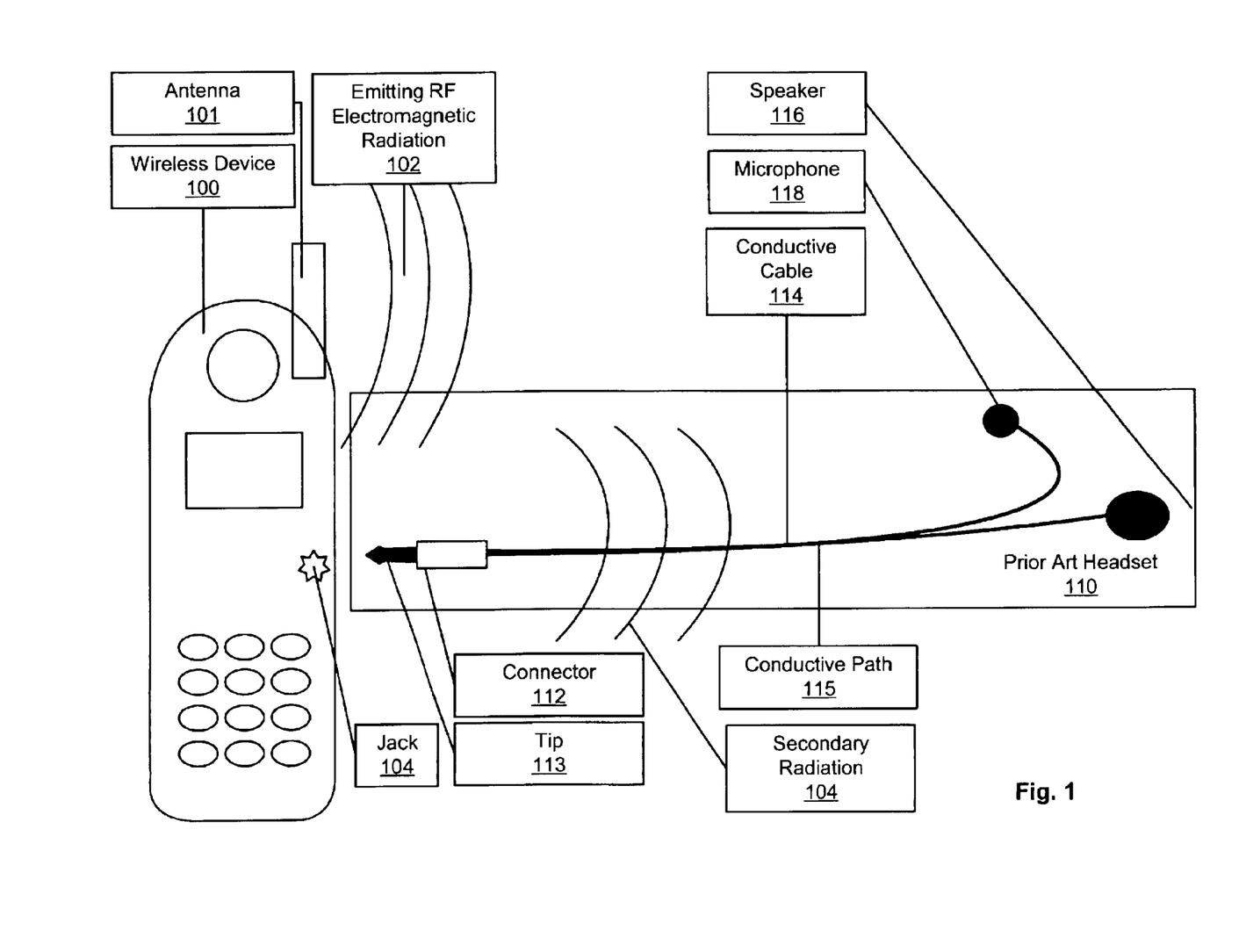
FIG. 1 is a schematic view of a headset coupled with a cellular phone, according to the prior art.

Turning now to the drawings, wherein like components are designated by like reference numerals throughout the various figures, attention is directed to FIG. 1 illustrating wireless device 100 that may be coupled with the prior art headset 110. The wireless device 100 is capable of emitting RF radiation, typically from the antenna 101 (which may be external, as shown in the diagram, or may be internal to the wireless device 100), during its operation. A jack 104 is also included to support communication between the wireless device 100 and headset 110. The headset 110 includes a connector 112, a conductive cable 114, a speaker 116 and a microphone 118. The connector 112 typically includes a tip 113 that is inserted into the jack 104 to provide a conductive path 115 between the wireless device 110 and the speaker 116 and/or microphone 118. When headset 110 is used in conjunction with the wireless device, at least a portion of the radiation 102 generated by the wireless device 100 can result in a secondary radiation 104 that is transferred along this conductive path 115 over the conductive cable 114 to speaker 116 and/or microphone 118 proximate a user's head. Correspondingly, an unintended side effect of using a typical prior art headset 110, can be an inadvertent transfer of secondary radiation 104 to the user.

Figure 2:
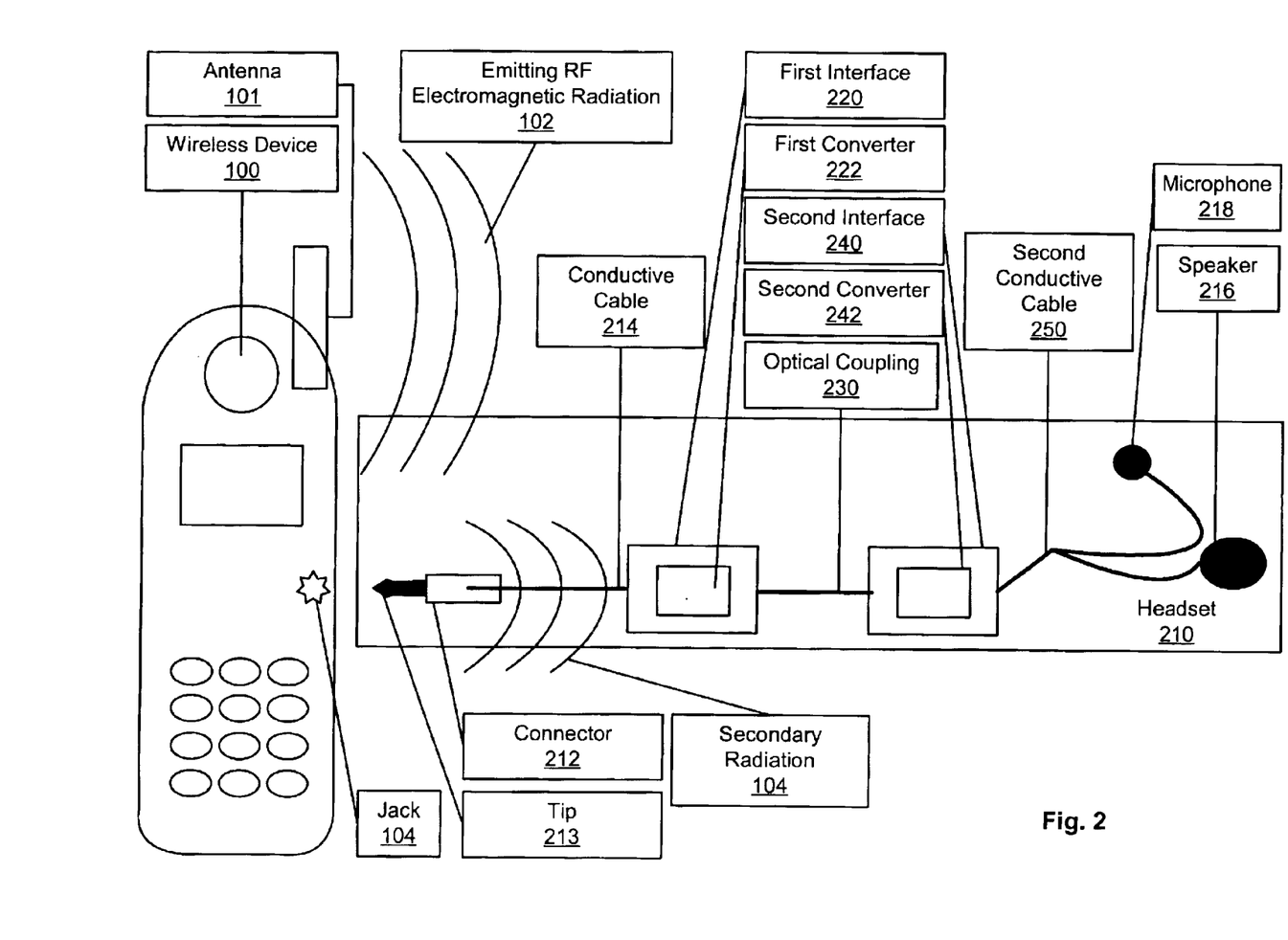
FIG. 2 is a schematic view of a headset coupled with a cellular phone, according to an embodiment of the present invention

FIG. 2 illustrates an exemplary headset 210 according to an embodiment of the present invention that may be coupled with the wireless device 100. Again, the wireless device 100 is capable of the emitting radiation 102 and may include a jack 104 to support communication using headset 210. The headset 210 includes a connector 212, a first interface 220, an optical coupling 230, a second interface 240, and a second conductive cable 250. The headset 210 may include a speaker 216, a flexible member 217, and a microphone 218, that are coupled with a second conductive cable 250 to support sending and/or receiving communications between the wireless device 100 and a user of the headset 210. As illustrated in FIG. 2, the connector 212 includes the tip 213 that is formed for releasable coupling with the jack 104. The connector 212 is further coupled with a first interface 220 using a first conductive cable 214. Correspondingly, radiation 102 emitted by the wireless device 100 can result in the secondary radiation 104 that is transferred along a conductive path of the first conductive cable 214.

The first conductive cable 214 supports communication between the connector 212 and the first interface 220, and may transfer secondary radiation 104 that is similar to that in prior art headset 110. Unlike the prior art headset 110, the first conductive cable 214 provides only a portion of a communication path between the wireless device 100 and the speakers 216 and/or microphone 218. Accordingly, the first conductive cable 214 does not transfer and/or amplify the secondary radiation 104 directly to the speakers 216 and the microphone 218.

The communication is delivered from the wireless device 100 to the first interface 220 for the translation into an optical signal for delivery using an optical coupling 230 to a second interface 240. Optical coupling 230, supports transferring optical signals without using a conductive cable 114 as required by the prior art headset. Accordingly, the optical coupling 230 reduces and/or prevents the transfer of radiation to the user. The second interface 240 is formed for receiving the communication in the optical signal from the optical coupling 230 and translating the communication for delivery to the user, such as, for example, to a speaker and/or microphone using a second conductive cable 250. A variety of other communications may also be used, such as, for example, a television viewing area that may be coupled with a wearable pair of glasses, and/or a camera for sending video communications.

The implementation of optical digital outputs and optical digital inputs for optical signals are known to one skilled in the art and are therefore not discussed in detail herein. Many electronic devices currently support optical inputs and/or outputs, such as, for example, optical digital outputs for PCM, Dolby Digital and DTS signals. One example communication system includes the LT1900 Fiber Optic Telephone Extender by Lascomm, of Westlake Village, Calif. The LT1900 is a commercially available fiber optic telephone extender that can be used to extend telephone service over an optical cable, and provides an example of a currently available technology to support the use of optical communication, using an optical cable.

The first converter 222 is typically placed proximate wireless device 100, with the second converter 224 ideally, although not necessarily, placed proximate the user, such as, for example, proximate the speaker 216 and/or microphone 218 that may be used by a user. The first converter 222 is capable of translating a communication received from the first conductive cable 214 into an optical signal that is transferred using the optical coupling 230. Additionally, the first converter may also be capable of translating an optical communication received from the optical coupling 230 into a second communication that is transferred using the first connector cable 214 to the wireless device 100. The communication may be a variety of different communication types, including, for example, an audio communication and/or a video communication. Accordingly, in one embodiment, an audio communication may be received from the first conductive cable 214 and translated into an optical communication that is transferred over the optical coupling. An optical communication may also be received from the optical coupling and translated into an audio communication that is transferred over first conductive cable 214.

The second interface 242 is capable of translating a communication received in an optical signal from optical coupling 230 into a second communication that is transferred and delivered to speaker 216 using second conductive cable 250. Additionally, the second interface may also be capable of translating a communication received from the second conductive cable 250, such as, for example, from microphone 218, into an optical signal that is transferred to first interface 220 using optical coupling 230, and thereby to wireless device 100.

Figure 3:
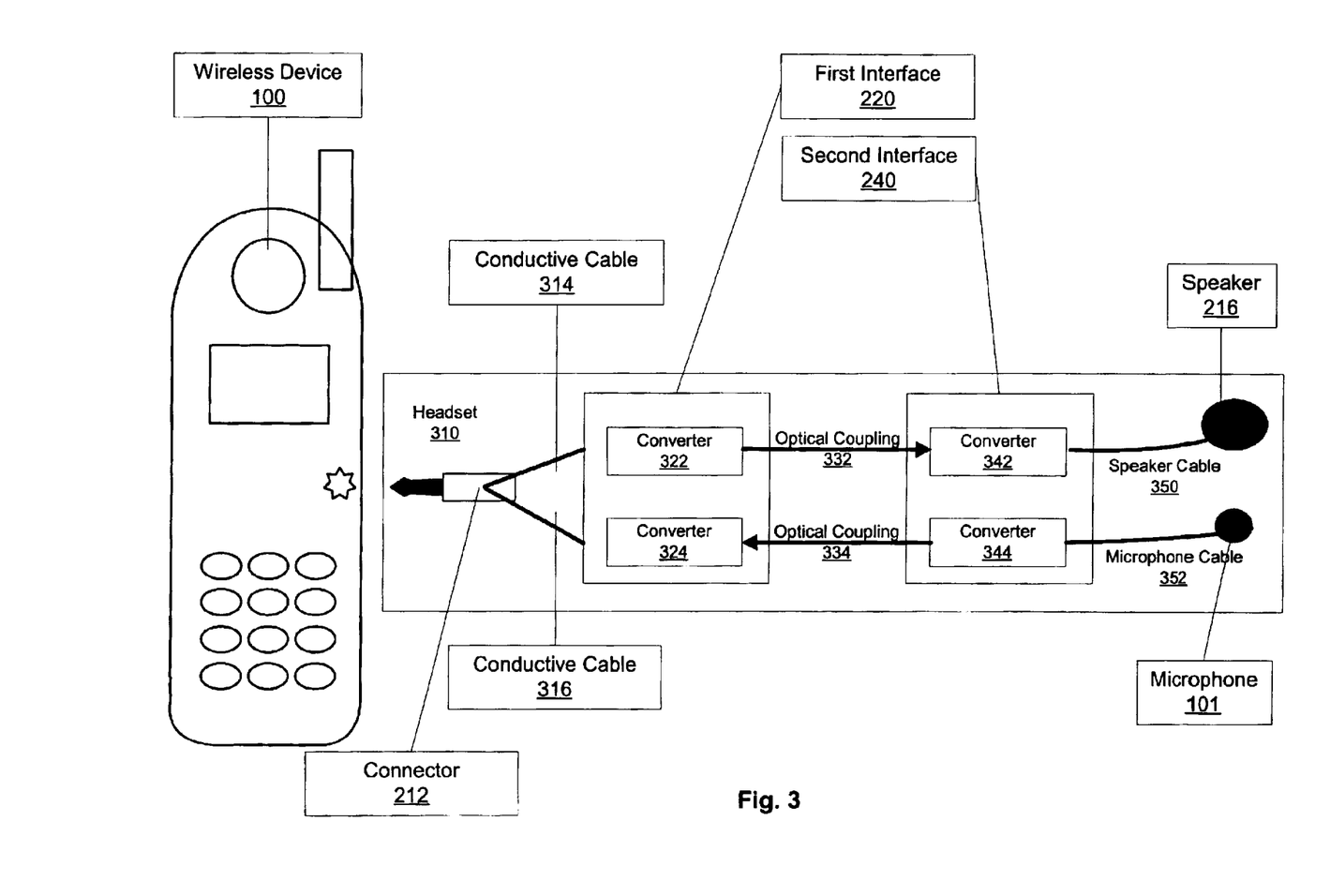
FIG. 3 is a schematic view of the headset of FIG. 2 generally illustrating the use of two converters to support the headset speakers, and the use of two converters to support the headset microphone, according to an embodiment of the present invention.

As illustrated in FIG. 3, the headset 310 may include a first interface 220 having one or more multiple converters 322, 324, one or more multiple optical couplings 332, 333, and a second interface 240 having one or more multiple converters 342, 344. As illustrated, the first interface 220 may include a first converter 322 for receiving output signals from the conductive cable 314 representing a communication to be sent to speaker 216. Accordingly, the communication to be sent to speaker 216 may be translated into a communication that is transferred from first converter 322 to second converter 342 using the optical coupling 332. The second converter 342 of the second interface 240, generates a representative output signal that is sent to the speaker 216 using a speaker cable 350. Accordingly, a user can use the speaker 216 to hear the communication from the wireless device 100, without the use of a contiguous conductive cable that may inadvertently provide a conductive path that may emit secondary radiation 104 to the user.

FIG. 3 also illustrates a separate set of converters that may be used to send a communication to the wireless device 100, such as, for example, a verbal communication that may be received by the microphone 218. The microphone 218 may receive the verbal communication to be sent to the wireless device 100, and transmit the communication over a conductive microphone cable 352 to second interface 240. A second converter 344, may be included with second interface 240, for converting the communication into an optical communication for transmission over optical coupling 334 to second interface 220. A second converter 324, may be included with the first interface 220, for receiving the optical communication and translating the optical communication into a second communication that is representative of the verbal communication received by the microphone 218. Accordingly, the user can use the microphone 218 to send a communication to the wireless device 100, without requiring a contiguous conductive cable that may inadvertently provide a conductive path for emitting secondary radiation 104 to the user.

Figure 4:
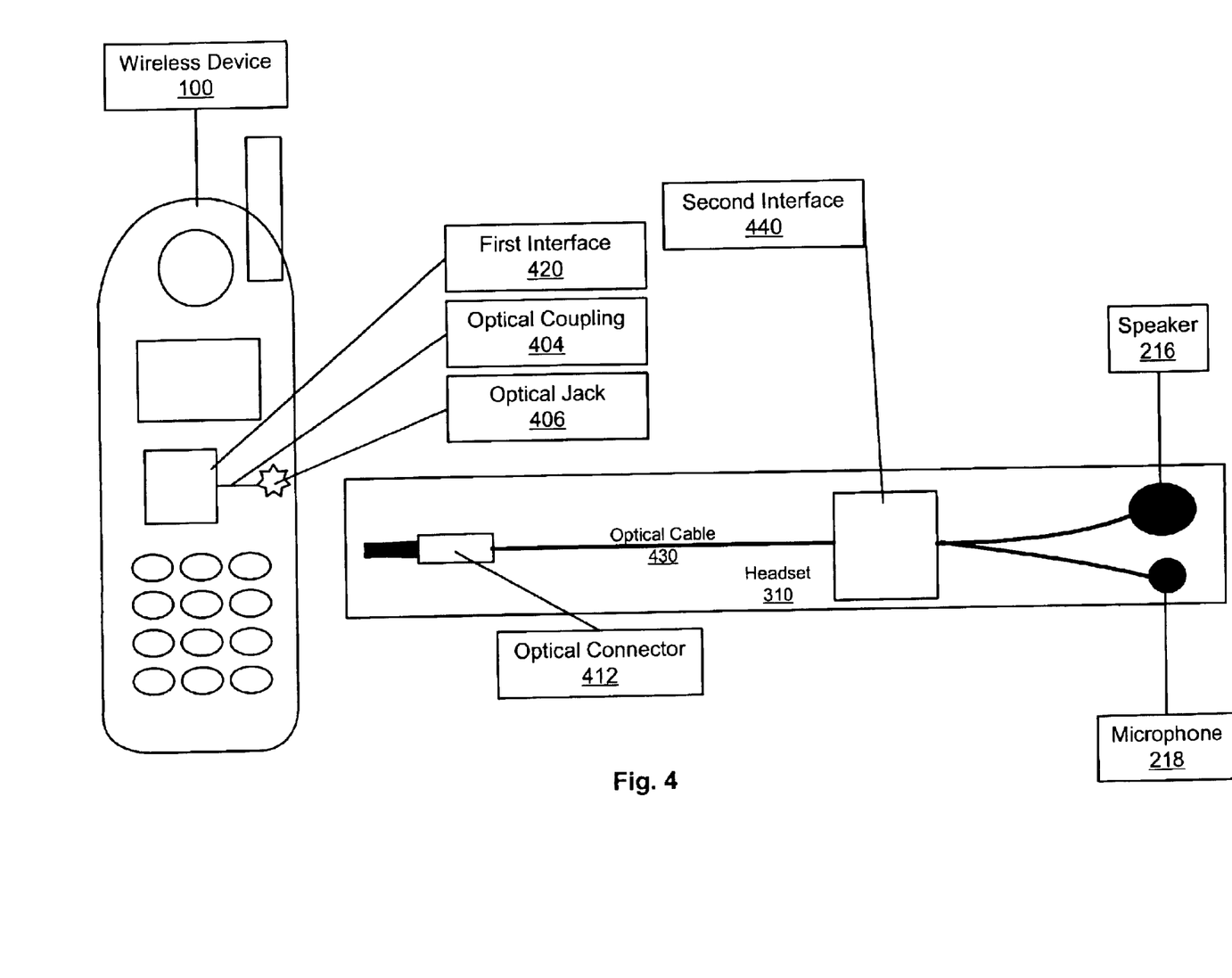
FIG. 4 is a schematic view generally illustrating at least one converter coupled to the wireless device and at least one corresponding converter approximate the headset, according to an embodiment of the present invention.

As illustrated in FIG. 4, an alternative embodiment of the present invention may include first interface 220 embedded within wireless device 100, which further includes an optical coupling 404 connected to an optical jack 406. The headset 410 includes an optical connector 412, an optical cable 430, and a second interface 440. The first interface 420 may be enclosed within a housing of the wireless device 100 and include support for the translation as described above, such as, for example, the functionality described for first interface 220. The optical connecter 412 is formed for releasable coupling with the optical jack 406. Optical couplings are known to one skilled in the art and therefore will not be further described herein. Accordingly, a user can use speaker 216 and/or microphone 218 to communicate with/through the wireless device 100, without requiring a contiguous conductive cable that may inadvertently provide a conductive path for emitting secondary radiation 104 to the user.

Figure 5:
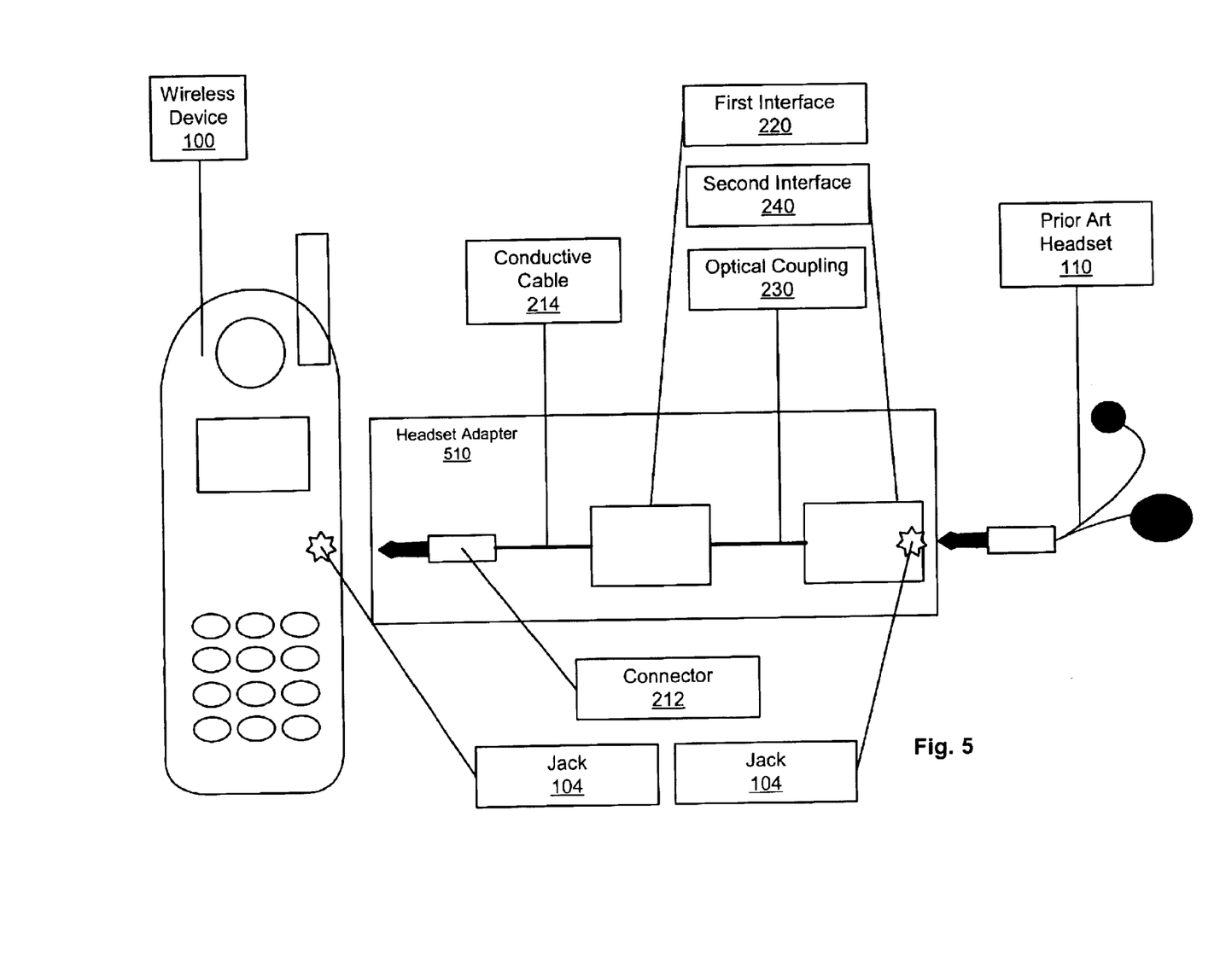
FIG. 5 is a schematic view generally illustrating at least two converters coupled to the wireless device, according to an embodiment of the present invention.

As illustrated in FIG. 5, an alternative embodiment of the present invention may include first interface 220, optical coupling 230, and second interface 240 and a jack 104. Accordingly, a user may use a typical prior art headset 110 to communicate with/through the wireless device 100, without requiring a contiguous conductive cable that may inadvertently provide a conductive path for emitting secondary radiation 104 to the user. According to one embodiment, a short optical coupling 230 may be used to help reduce secondary radiation 104 that may be transferred to the user. In one embodiment, first interface 220, optical coupling 230, and second interface may be combined using a single integrated chip design. In another embodiment, the first interface 220 and second interface 240 may be combined using a single integrated chip design capable of being coupled with an optical coupling 230. In some embodiments, the optical coupling 230 may be an air gap contained within a housing or within a chip, such as a version of an opto-isolator chip. For example the short optical coupling may be an optical coupling having an optical path length shorter than about 25 mm, shorter than about 10 mm, shorter than about 5 mm, shorter than about 1 mm, or any relatively short optical path length that provides the desired isolation. For example in a electronic chip, optical chip, or hybrid opto-electronic chip an optical path length of one to a few microns may be used to achieve the desired dis-connectivity or isolation depending upon the frequency of the signal. Alternatively, the optical path length may be greater than 25 mm, such as for example any length from about 25 mm to several meters.

Figure 6:
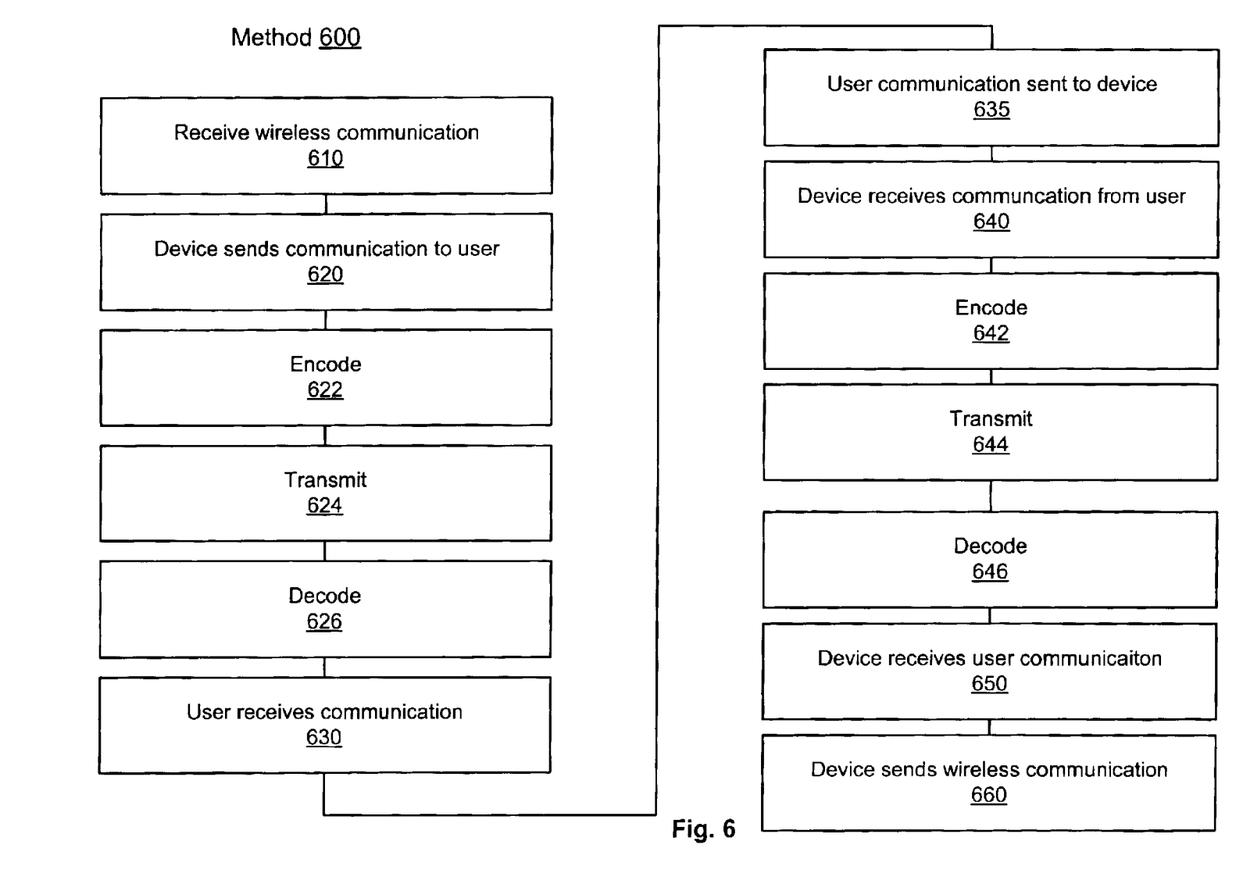
FIG. 6 generally illustrates a method to support communication, according to an embodiment of the present invention.

The method of communication in accordance with one embodiment of the present invention can now be described. As illustrated in FIG. 6, the method 600, according to one embodiment of the present invention, is generally depicted as an interaction between a wireless device, such as, for example, a cellular phone, and a user. The wireless device 100 may receive a communication at 610 and may forward a representative verbal communication to the user at 620 that may be heard from the speaker 216. The first interface 220 may encode the audio communication into an optical signal at 622 for transmission at 624 across optical coupling 230. The second interface 240 may receive and decoded the optical signal at 626 to generate a representative audio communication that the user can receive at 630 using the speaker 216.

The wireless device 100 may also receive communications from the user. Accordingly, a user communication may be sent at 635, such as for example, by using microphone 218. The user communication may be forwarded to the wireless device 100 at 640. The user communication may represent a verbal communication sent by the user at 635 using the microphone 218. The second interface 240 may encode the user communication into an optical communication at 642 for transmission at 644 across optical coupling 230. The first interface 220 may receive and decoded the optical communication at 646 to generate a representative user communication that the wireless device may receive at 650 using the jack 104. The wireless device 100 may then transmit the communication to another device at 660, for example using the antenna 101.

Figure 7:
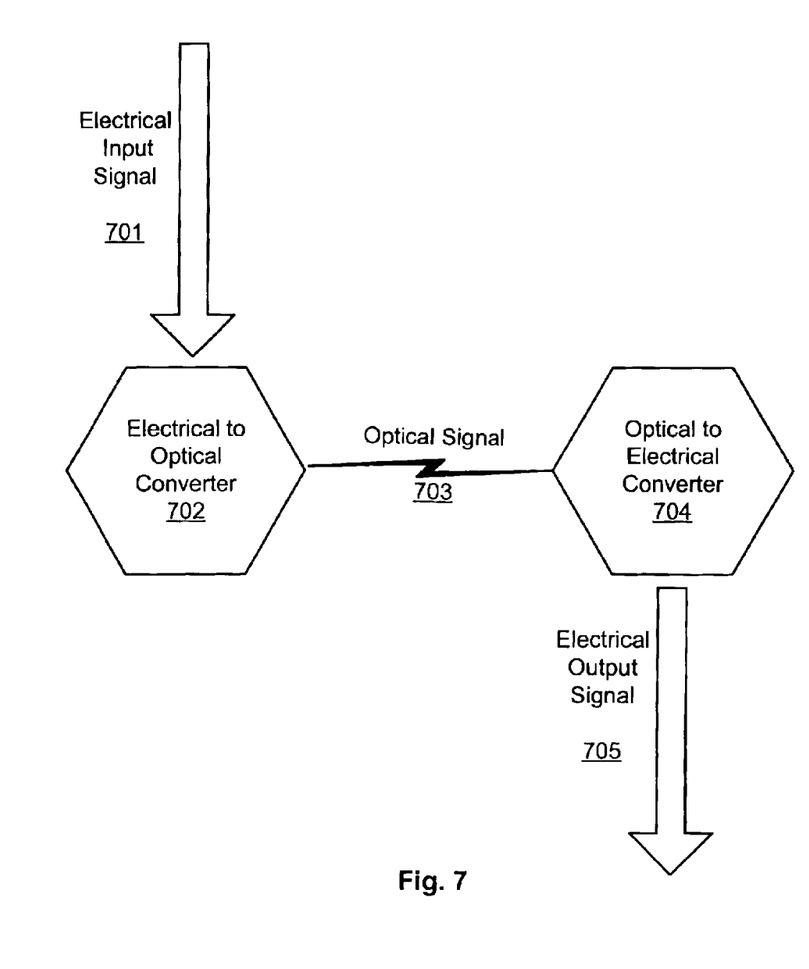
FIG. 7 generally illustrates the overall process of optical conversion utilized in a preferred embodiment of the present invention.

The overall process utilized in a preferred embodiment may be better understood with reference to FIG. 7, Optical Conversion. The processes of voltage to optical conversion are well known, but will be reviewed here briefly.

In the optical conversion process, an audio Electrical Input signal 701, such as the signals commonly used or produced by prior art headsets 110 and wireless devices 100, and generally used to drive speakers and produced by microphones, typically consists of an analog electrical signal where the amplitude of the voltage varies with volume or loudness of the sound and the frequency of voltage changes correspond to the frequency of the sound. This Electrical Input Signal 701 is input to an Electrical to Optical Converter 702, which converts the audio information of the electrical signals to optical signals. These may be either analog light signals where corresponding input voltages cause corresponding relative output photon intensities to be produced, or the Electrical to Optical Converter 702 may perform an analog-to-digital conversion in which the input analog voltages are digitized and represented by numerical values, or other methods of modulation such as frequency modulation may be utilized. In the case of analog-to-digital conversion, the resulting numerical values are then transmitted as pulses of light, using either binary values or other methods. The result of electrical to optical conversion is an Optical Signal 703. This Optical Signal 703 is transmitted through optical fibers (or other optically conductive media) in a preferred embodiment. These optical fibers are typically made of glass or plastic. In other embodiments, the Optical Signal 703 may be transmitted through the air without the use of optical fibers.

The Optical Signal 703 is received by an Optical to Electrical Converter 704. This device performs substantially the inverse operation of the Electrical to Optical Converter 702. If, in a particular Embodiment, the Optical Signal 703 is analog, the Optical to Electrical Converter 704 converts the light to corresponding output voltages. If, in a particular Embodiment, the Optical Signal 703 is digital, the Optical to Electrical Converter 704 converts the digitally encoded numerical values to the corresponding output voltages. This process of conversion results in the Electrical Output Signal 705, which is a close copy of the Electrical Input Signal 701. In some Embodiments, the user can elect to vary the loudness or other characteristics of the Electrical Output Signal 705 as compared to the Electrical Input Signal 701.

In a preferred embodiment, the process performed by an Electrical to Optical Converter 702 is that process represented in FIG. 6 as Encode 622, 642 and the process performed by an Optical to Electrical Converter 704 is that process represented in FIG. 6 as Decode 626, 646.

In some Embodiments, the distance between the Optical to Electrical Converter 704 and the Electrical to Optical Converter 702 may be of varying lengths, and in other Embodiments both the Optical to Electrical Converter 704 and the Electrical to Optical Converter 702 may be contained on the same chip, similar to an opto-isolator chip.

Advantageously, the present invention allows a user to interact with a wireless device with a limited exposure to radiation. Accordingly, reducing the potential exposure to secondary radiation that may be transferred and/or amplified by a conductive cable between the headset and the wireless device.

According to one embodiment, the first interface 220 and any corresponding converters, such as for example 222 are housed within a first protective sheathing, and, the second interface 240 and any corresponding converters, such as for example 242, are housed within a second protective sheathing. In another embodiment, the first interface 220 and second interface 240 may be housed within a common sheathing.

According to one embodiment, the length of the optical coupling 230 may be longer than the combined length of first conductive cable 214 and/or second conductive cable 250. Alternatively, the optical coupling 230 may be shorter than the combined length of first conductive cable 214 and/or second conductive cable 250.

As will be apparent to practitioners skilled in the art in light of the description provided here that numerous variations in placement, cable lengths and combinations of components are possible. In one embodiment, the connecter 212 may include and house the first conductive cable 214 and/or the first interface 220. In one embodiment the microphone 218 and/or microphone housing may include and house at least a portion of the second conductive cable and/or at least a portion of the second interface 240 (such as, for example, the converter 344). In one embodiment the speaker 216 and/or speaker housing may include and house at least a portion of the second conductive cable and/or at least a portion of the second interface 240 (such as, for example, the converter 342). In one embodiment the speaker 216 and/or speaker housing may include and house the second conductive cable and the second interface 240.

According to one embodiment, additional information (such as, for example, control information) may be transmitted via conductive cables 214, 250, additional conductive cables, and/or optical coupling 230. Accordingly, control information such as loudness control, commands to answer the telephone, hang up, or other control information is communicated to the first interface 220 and/or second interface 240.

According to one embodiment, additional components such as switches and indicators may be added to further support transmitting and/or receiving control information. In one embodiment, video or other communicative information may be transmitted and/or received. Components such as video screens or cameras may be added. For example, a small video screen may be attached to eyeglasses that may be worn by a user, possibly including speaker 216 coupled with the eyeglasses. Video data may be received from the Wireless Telephone 100 similarly to other communications, such as audio communications. Further, a video camera may also be added and may be attached to eyeglasses. In one embodiment, video data may be transmitted to and/or received from the wireless device 100 in a similar manner to that of audio communications described above.

According to some embodiments, the method of conversion between electrical and optical signals as performed by interfaces such as interfaces 220 and 240 is an analog conversion. In other embodiments, the conversion is a digital conversion.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A headset apparatus, couplable to a wireless device capable of emitting radio frequency electromagnetic radiation, that reduces exposure of a user to the radio frequency electromagnetic radiation by transferring at least one communication between a first interface proximate the wireless device and a second interface, the headset apparatus comprising:

a first converter to receive the communication and in response to generate an optical communication, said first converter coupled with a first selected one of the first interface and second interface;

a second converter to receive said optical communication and in response to generate a second communication, said second converter coupled with a second selected one of the first interface and the second interface different from the first selected one, wherein said first and second converters are coupled with different interfaces; and an optical coupling between said first and second converters to communicate said optical communication therebetween and to reduce transferred radio frequency electromagnetic radiation therebetween.

2. The headset of claim 1, wherein the communication includes an output audio communication from the wireless device to a user, wherein said headset apparatus further comprises: a speaker couplable to the user and a connector couplable to said wireless device, wherein the audio communication is transferred using said connector to said first converter coupled with said first interface, and said second communication is transferred using said speaker to the user.

3. The headset of claim 1, wherein:
the communication includes an input audio communication from a user to the wireless device; and
the headset apparatus further comprises a microphone couplable to the user and a connector couplable to said wireless device, wherein the input audio communication is transferred using said microphone to said first converter coupled with said second interface, and said second communication is transferred using said connector to the wireless device.

4. The headset of claim 1, wherein the optical coupling is a fiber optic cable.

5. The headset of claim 4, wherein said fiber optic cable includes a first distal end coupled with said first interface, and a second distal end coupled with said second interface.

6. The headset of claim 5, wherein the optical coupling is at least a length that extends away from the facial and cranial regions of the users head.

7. The headset of claim 1, wherein a housing encloses the first converter, the optical coupling, and the second converter.

8. The headset of claim 1, wherein at least one of said first converter and said second converter are enclosed within a housing of the wireless device.

9. The headset of claim 1, wherein the first converter and the second converter at the wireless device-end of the optical coupling are inside the wireless device.

10. The headset of claim 1, further comprising: an optical interface jack in the device, for removably connecting an optical coupling that is a component of the headset or attachable to the headset.

11. The headset of claim 1, wherein said first converter and said second converter supports a communication of a communication type selected from a group of types consisting of: (i) audio type communication to the user, (ii) audio type communication to the wireless device, (iii) video type communication to the user, (iv) video type communication to the wireless device, (v) control type communication, and (vi) a combination of these communication types.

12. The headset of claim 1, wherein the communication is at least one of a communication transferred from the wireless device to the user and communication transferred from the user to the wireless device.

13. A device as in claim 2, wherein:
the optical communication occurs through an optical transmission medium over a length less than 10 mm; and
the headset and wireless device are connected by means of electrical wires.

14. A device as in claim 13, wherein two said devices are provided, one at either end of one or a pair of electrical wires.

15. A device as in claim 13, wherein a plurality of such devices are coupled in series.

16. A method of reducing exposure of a user to electromagnetic radiation by transferring at least one communication between a first interface, proximate a wireless device capable of emitting radio frequency electromagnetic radiation, and a second interface, the method comprising:

receiving the communication by a first converter and in response generating an optical communication, said first converter coupled with one of the first interface and second interface;

receiving said optical communication by a second converter and in response generating a second communication, said second converter coupled with one of the first interface and the second interface, wherein said first and second converters are coupled with different interfaces; and communicating said optical communication using an optical coupling between said first and second converters to reduce transferred radiation therebetween.

17. A system to reduce exposure of a user of a wireless device to electromagnetic radiation by transferring at least one communication between a first interface, proximate the wireless device capable of emitting radio frequency electromagnetic radiation, and a second interface, the system comprising:

a first converter to receive the communication and in response to generate an optical communication, said first converter coupled with one of the first interface and second interface;

a second converter to receive said optical communication and in response to generate a second communication, said second converter coupled with one of the first interface and the second interface, wherein said first and second converters are coupled with different interfaces; and an optical coupling between said first and second converters to communicate said optical communication therebetween and to reduce transferred radiation there between.

18. An optical interface for use with device utilizing radio frequency signals, the interface comprising:

a first converter receiving a first electrical signal carrying an information content and generating an optical signal carrying substantially the same information content as said electrical signal in response thereto;

a second converter receiving said optical signal and generating a second electrical signal and carrying substantially the same information as said optical signal; and an optical coupling between said first and second converters to communicate said optical signal there between, the optical coupling operating substantially without radiating radio frequency electromagnetic radiation to regions adjacent the optical coupling.

19. A headset adapter providing a communication link between a wireless device and a headset without requiring a contiguous electrically conductive path that may inadvertently provide a conductive path for emitting secondary radiation to the user; the headset adapter comprising:
a first interface a second interface;

an optical coupling extending between the first and second interfaces and having no complete electrically conductive path there between;

a first connector jack for mateably coupling the headset adapter with an external headset having a least an earphone, a speaker, and a microphone;

a second connector jack for mateably coupling the headset adapter with another device; and the first and second connector jacks configured to optically or electrically couple to the headset and the device.

20. A headset adapter as in claim 19, wherein a short optical coupling is used to help reduce secondary radiation that may be transferred to the user.

21. A headset adapter as in claim 19, wherein first interface, optical coupling, and second interface are combined using a single integrated chip design.

22. A headset adapter as in claim 19, wherein the first interface and second interface are combined using a single integrated chip design and coupled with an optical coupling.

23. A headset adapter as in claim 19, wherein the optical coupling comprises an air gap contained within a housing or within a chip.

24. A headset adapter as in claim 19, wherein the optical coupling comprises an optical fiber.

25. A headset adapter as in claim 19, wherein the optical coupling consists of an air gap.

26. A headset adapter as in claim 19, wherein the optical coupling comprises an opto-isolator chip.

* * * * *